(12) United States Patent
Reichow et al.

(10) Patent No.: US 7,551,360 B2
(45) Date of Patent: *Jun. 23, 2009

(54) INCLINED-EDGE SPORTS LENS

(75) Inventors: Alan W. Reichow, Beaverton, OR (US); Karl Citek, Hillsboro, OR (US)

(73) Assignee: Nike, Inc., Beaverton, OR (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/157,361

(22) Filed: Jun. 9, 2008

(65) Prior Publication Data

US 2008/0246915 A1   Oct. 9, 2008

Related U.S. Application Data

(63) Continuation of application No. 11/489,380, filed on Jul. 18, 2006, now Pat. No. 7,043,346.

(51) Int. Cl.
*G02B 3/00* (2006.01)
*A42B 3/20* (2006.01)

(52) U.S. Cl. .................. 359/642; 359/815; 351/159; 2/424; 2/425; 2/428

(58) Field of Classification Search ............. 359/809, 359/811, 815, 817, 819, 642; 2/6.3–6.5, 2/6.7, 15–427, 431–435, 441–447, 452; 351/159–177

See application file for complete search history.

(56) References Cited

U.S. PATENT DOCUMENTS

| | | | |
|---|---|---|---|
| 2,860,343 A | 11/1958 | Aileo | |
| 3,063,340 A | 11/1962 | Dillon | |
| 3,870,405 A * | 3/1975 | Hedges | 359/631 |
| 3,981,709 A | 9/1976 | Kondo et al. | |
| 4,271,538 A | 6/1981 | Montesi et al. | |
| D288,980 S | 3/1987 | Pernicka | |
| 5,056,270 A | 10/1991 | Curcher | |
| D360,488 S | 7/1995 | Cardinal | |
| 5,815,848 A | 10/1998 | Jarvis | |
| 6,010,217 A | 1/2000 | Houston et al. | |
| 6,099,383 A | 8/2000 | Mizuno et al. | |
| 6,203,409 B1 | 3/2001 | Kennedy et al. | |
| 6,264,692 B1 | 7/2001 | Woffinden et al. | |
| 6,328,630 B1 | 12/2001 | Jinbo et al. | |
| 6,755,525 B2 | 6/2004 | Reichow et al. | |
| 7,014,315 B2 | 3/2006 | Iori et al. | |
| 7,403,346 B2 | 7/2008 | Reichow et al. | |

(Continued)

FOREIGN PATENT DOCUMENTS

DE    3623905    2/1988

(Continued)

*Primary Examiner*—Darryl J Collins
(74) *Attorney, Agent, or Firm*—Chernoff, Vilhauer, McClung & Stenzel, LLP

(57) ABSTRACT

An optical lens has an inner lens surface and an outer lens surface separated by a lens thickness adjacent to an edge portion of the lens. The edge portion has at least a partially exposed edge surface extending substantially linearly from the inner lens surface toward the outer lens surface coextensively with at least a major portion of the lens thickness at a location adjacent to the edge portion, and at a predetermined inclination with respect to a portion of the lens surface at such location.

26 Claims, 5 Drawing Sheets

U.S. PATENT DOCUMENTS

2002/0075446 A1 6/2002 Lossman et al.
2005/0168686 A1 8/2005 Chow et al.

FOREIGN PATENT DOCUMENTS

| EP | 1293821 | 3/2003 |
| JP | 10090632 | 4/1998 |
| JP | 2002239882 | 8/2002 |

\* cited by examiner

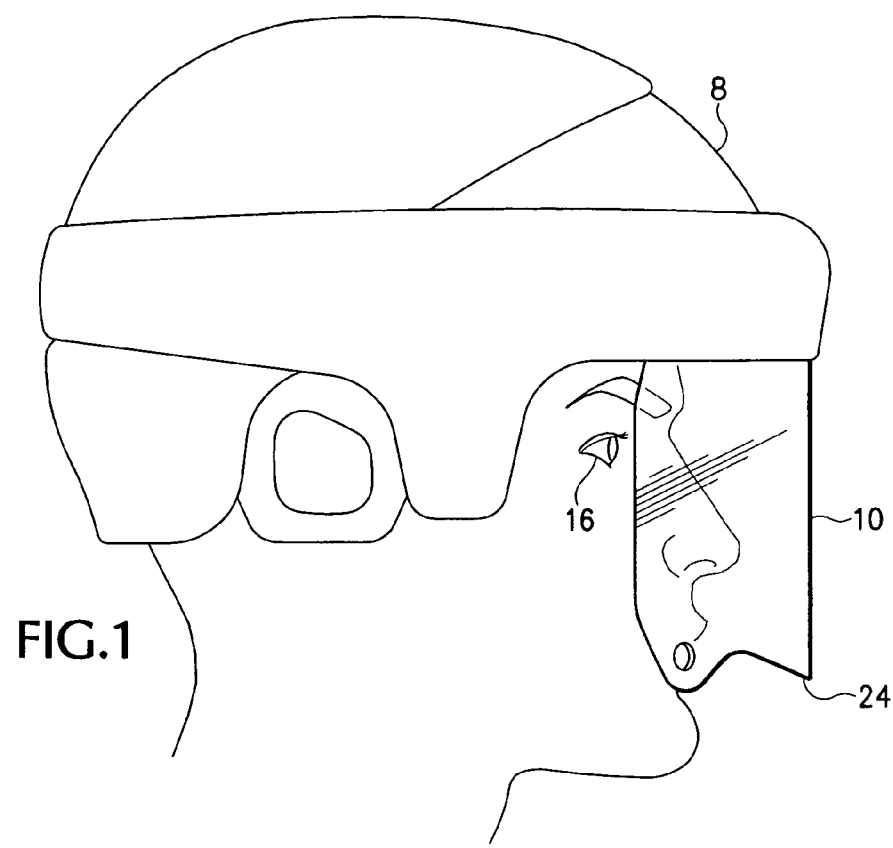
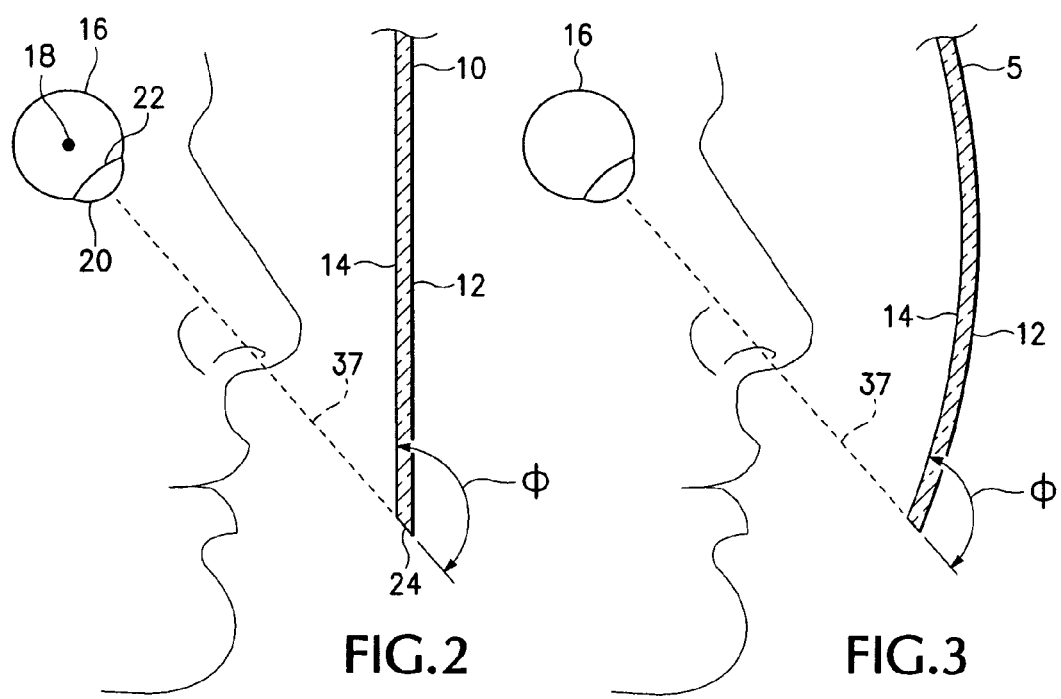

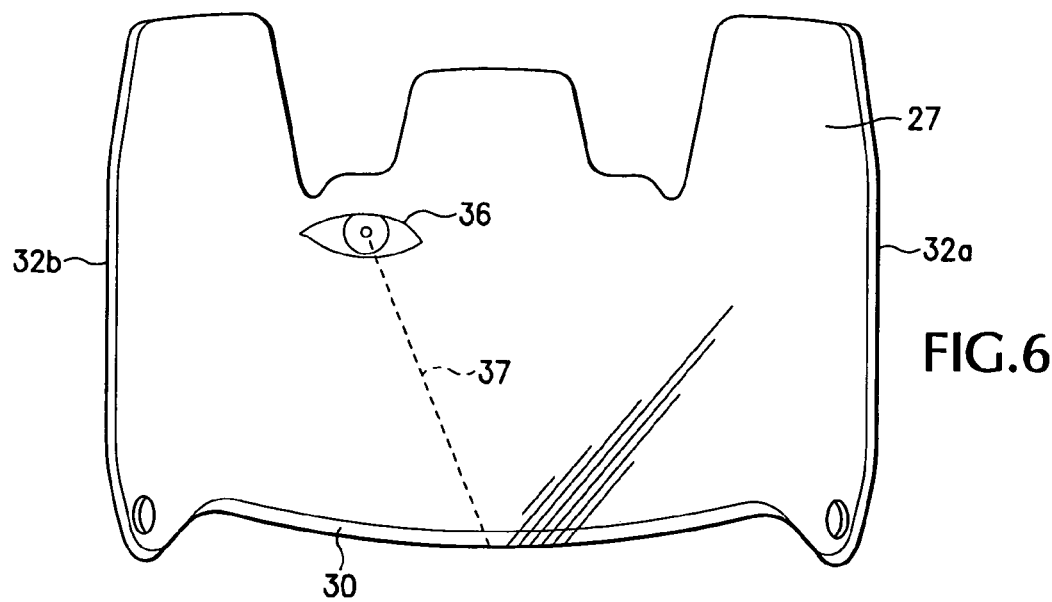
FIG.6
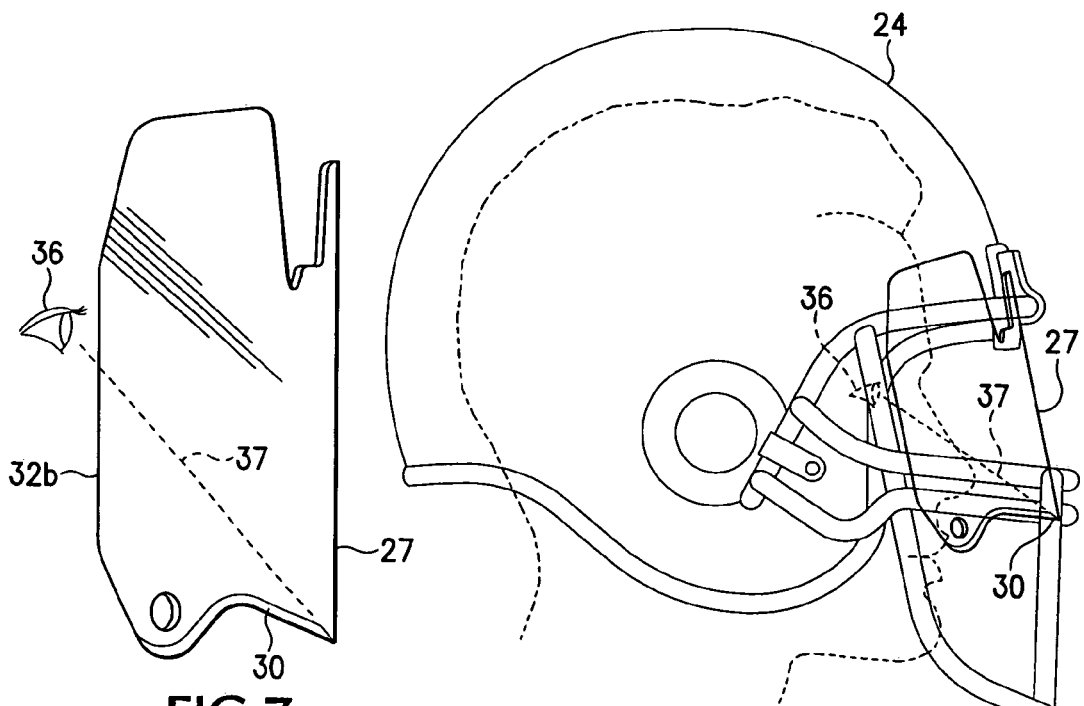
FIG.7
FIG.8
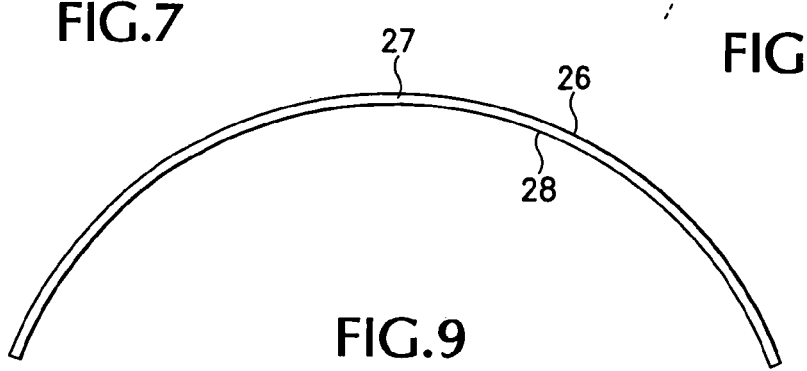
FIG.9

INCLINED-EDGE SPORTS LENS

CROSS-REFERENCE TO RELATED APPLICATIONS

This application is a continuation of U.S. patent application Ser. No. 11/489,380 filed Jul. 18, 2006 now U.S. Pat. No. 7,403,346.

STATEMENT REGARDING FEDERALLY SPONSORED RESEARCH OR DEVELOPMENT

Not applicable.

NAMES OF PARTIES TO A JOINT RESEARCH AGREEMENT

Not applicable.

REFERENCE TO SEQUENCE LISTING, A TABLE, OR A COMPUTER PROGRAM LISTING COMPACT DISC APPENDIX

Not applicable.

BACKGROUND OF THE INVENTION

In recent years, there has been a trend to produce eyewear for use in active sports. Such eyewear takes the form of either unitary optical lenses that form face shields (i.e., visors) that are connected to helmets, or unitary or dual lenses that are more conventionally associated with specialized spectacles. For example, football and hockey helmets may have face shields attached to provide protection in a fairly wide field of view. These shields typically have a convex arcuate shape that curves at least in a horizontal plane and attaches to the helmet. Specialty sports glasses also have relatively large convex arcuate surfaces connected to frames that provide a shielding or protective function and thus have a fairly wide field of view.

The wide field of view is necessary because the sports practitioner must be able to direct his line of sight horizontally and vertically over wide angles in order to be able to perceive events that may be happening very quickly.

Many of the foregoing types of optical lenses are not totally enclosed by a frame. They are, at least on a portion of the edge of the lens, rimless. Typically, the rimless edge portions of eyeglass lenses are beveled in a V-shape or are rolled, i.e., they have a continuously curved edge. Unitary shield lenses on football and hockey helmets generally incorporate either a flat, rimless edge surface, which is approximately perpendicular to the front or back surface of the lens and has beveled edges, or a naturally convex arcuate shape, which is a side effect of the lens manufacturing process.

The traditional shapes of these exposed, rimless edges cause several detrimental visual effects including specular lens reflections, visual field interference (scotomatous ring), prismatic distortion, unwanted astigmatism, glare, multiple secondary images due to internal reflections, and ghost images. These effects are most pronounced when the wearer's line of sight is directed to a location that is near the rimless edge of the lens. For example, visual field loss at the exposed lower edge of a typical face shield lens having an average edge thickness is on the order of three-fourths of one degree (0.75°). Furthermore, if the edge is molded rather than cut to shape, there may be an additional 1.6° of high distortion in the exposed edge area. Thus, there may be a total visual field loss of approximately 2.4° at the exposed edge of a usable lens. While these amounts of "blind" areas sound small, they are significant because of the loss of functional visual space around much of the circumference of the lens and they can be detrimental to play. For example, a regulation American football thrown with a tight spiral subtends an angle of less than 0.75° at any distance greater than 16.7 yards; the same football viewed edgewise, as during a kickoff, subtends an angle of less than 0.75° at any distance greater than 25.1 yards.

In addition, disability glare and annoyance reflections, which are caused by internal reflection of a traditional exposed lens edge, may have detrimental effects on the wearer's ability to perceive objects near the edge of the lens and to maintain visual attention and focus. When combined with the visual field loss noted above, traditional lens designs have significant blind areas that prevent normal functional visual use in their exposed edge regions.

BRIEF SUMMARY OF THE INVENTION

An optical lens has an inner lens surface and an outer lens surface separated by a lens thickness adjacent to an edge portion of the lens. The edge portion has at least a partially exposed edge surface extending substantially linearly from the inner lens surface toward the outer lens surface coextensively with at least a major portion of the lens thickness at a location adjacent to the edge portion, and at a predetermined inclination with respect to a portion of the lens at such location.

The foregoing and other objectives, features, and advantages of the invention will be more readily understood upon consideration of the following detailed description of the invention, taken in conjunction with the accompanying drawings.

BRIEF DESCRIPTION OF THE SEVERAL VIEWS OF THE DRAWINGS

FIG. 1 is a side view of an athlete wearing a sports helmet with an exemplary unitary face shield lens attached, with curvature in a horizontal plane.

FIG. 2 is a partial side view of the athlete's face in FIG. 1 with an enlarged cutaway view of the face shield lens.

FIG. 3 is a partial side view of an athlete wearing a horizontally and vertically curved face shield lens shown in a cutaway view.

FIG. 6 is a front view of a lens similar to that of FIG. 2 for use with a football sports helmet.

FIG. 7 is a side elevation view of the lens of FIG. 6.

FIG. 8 is a side view of a sports helmet fitted with the lens of FIG. 7 showing a wearer in dashed outline.

FIG. 9 is a top view of the lens of FIG. 6.

DETAILED DESCRIPTION OF PREFERRED EMBODIMENTS

Figure 4:
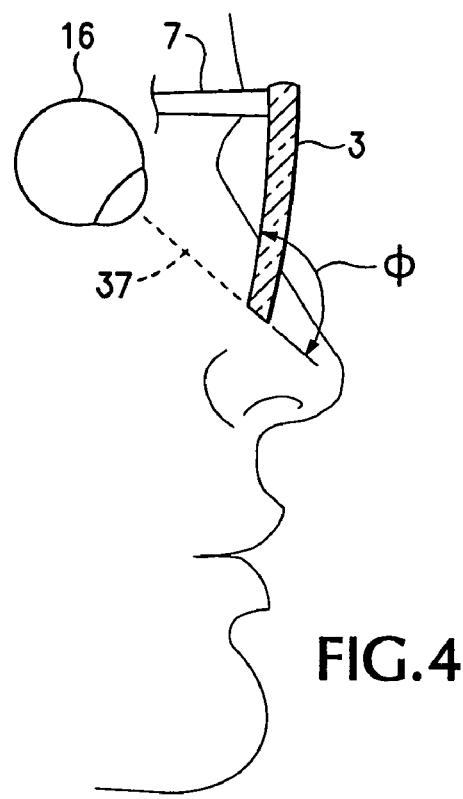
FIG. 4 is a partial side view of an athlete wearing sports glasses with a horizontally and vertically curved lens in a cutaway view.

A unitary face shield lens 10, shown in FIGS. 1 and 2, has an outer surface 12 and an inner surface 14. The lens is held by a support, which may be a helmet 8 (see FIG. 1). Alternatively, an eyeglass frame 7 can be used to support a lens 3 (see FIG. 4) of a unitary or dual lens arrangement, as desired.

The lens 10 may be generally convexly curved only in a horizontal plane, or may also have convex curvature in a vertical plane as exemplified by the convexly curved lens 5 in FIG. 3. Preferably, the radii of curvature of the outer and inner surfaces 12, 14 have respective different lengths and centers of curvature so that the lens is thickest in its center and becomes gradually thinner as it extends in both directions along the curvature, so as to minimize distortion as explained, for example, in U.S. Pat. No. 4,271,538, which is hereby incorporated by reference. The lens 10 can alternatively be a flat pane lens.

The wearer's eye 16 has a center of rotation 18 (FIG. 2). The center of rotation of the eye 16 is displaced rearwardly from the cornea 20 of the eye.

Figure 5:
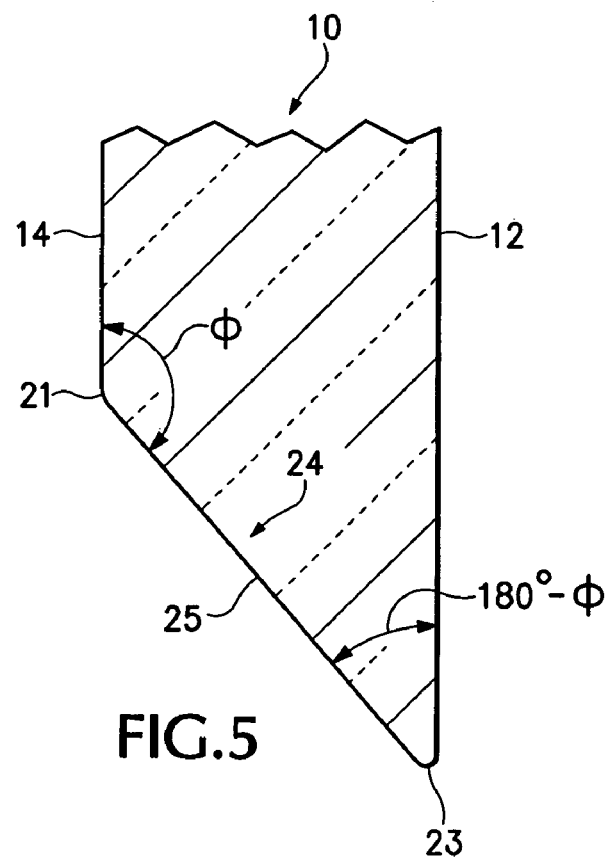
FIG. 5 is an enlarged partial cutaway side view of the lower edge of the lens of FIG. 2.

With reference to FIG. 5, the lens 10 has an edge portion 24 that includes inner and outer extremities 21 and 23, which may be slightly rounded or beveled for safety, adjacent to the inner and outer surfaces 12 and 14. An edge surface 25 extends substantially linearly in a direction from the inner surface 14 toward the outer surface 12, over a major portion of the lens thickness adjacent to the edge portion 24. The edge surface 25 is formed to have an obtuse angle $\Phi$ with respect to the inner surface 14, and an acute angle $180°-\Phi$ with respect to the outer surface 12, at locations adjacent to the edge portion 24. If the lens 10 is curved vertically, the obtuse and acute angles may be defined with reference to imaginary lines vertically tangent to the inner and outer surfaces 12 and 14, respectively, at locations adjacent to the edge portions 24. In such cases, the acute angle might only approximate $180°-\Phi$ because the two tangents might not be parallel to each other due to different vertical curvatures of the inner and outer lens surfaces as explained previously with reference to U.S. Pat. No. 4,271,538. The obtuse angle $\Phi$ is chosen, optimally, to be substantially parallel to the viewer's line of sight when the eye 16 is directed toward the edge surface 25 of the lens 10. The dashed lines in FIGS. 2-4 represent the line of sight 37 when directed toward the edge surface of each respective lens shown.

A preferred example of a lens especially adapted for use in a football helmet is shown in FIGS. 6-9. The lens 27 is affixed to a football helmet 24. The lens 27 is preferably made of a polymeric lens material, such as polycarbonate, in the form of a substantially cylindrical visor similar to lens 10 in FIGS. 1 and 2. One example of lens 27 has an outside surface 26 and an inside surface 28 with a preferable thickness "t" of 2.7 millimeters; other examples of lenses can have different thicknesses. The lens 27 is mounted on the football helmet 24 so that there is a lower exposed peripheral edge 30. There are also exposed side edges 32a and 32b, but because of the mating orientation of the lens 27 to the football helmet, the primary area of interest relative to the wearer's line of sight is the lower edge 30. In some configurations, the superior edge of the lens may be of interest.

With the helmet 24 worn in a normal position, the wearer's eye (illustrated schematically as 36) may have its line of sight 37 directed toward the edge surface 30 as indicated by the dashed line in FIGS. 6-8. The edge surface 30, which is preferably a nearly continuous surface extending linearly in a direction from the inner surface 28 toward the outer surface 26, is cut at an angle that is substantially parallel to the line of sight 37 of the wearer. Due to the uneven contour of the lower portion of the edge surface 30, the angle may be varied along the edge surface 30 because, as the eye 36 rotates toward the sides 32a and 32b of the lens, the angle of the line of sight changes. In practice however, it is not necessary to form the inclined edge surface angle in those edge portions of the lens substantially outside of the wearer's usable field of view.

Figure 10:
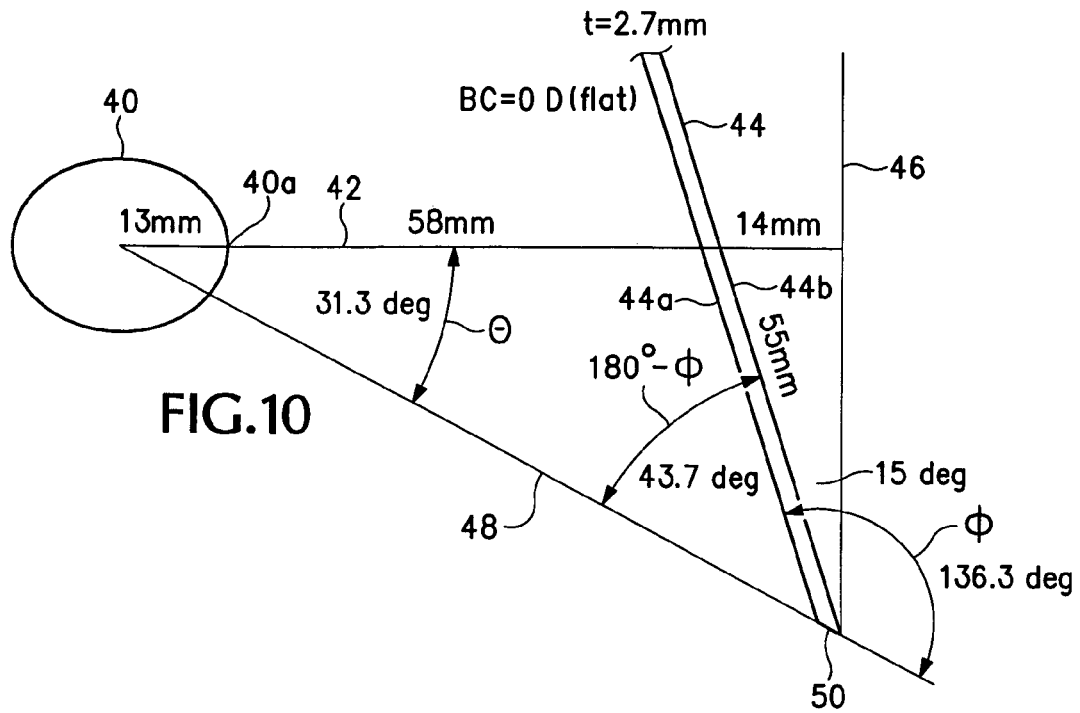
FIG. 10 is a schematic view illustrating angles and distances as a typical example of fitting a horizontally curved face shield to a wearer.
Figure 11:
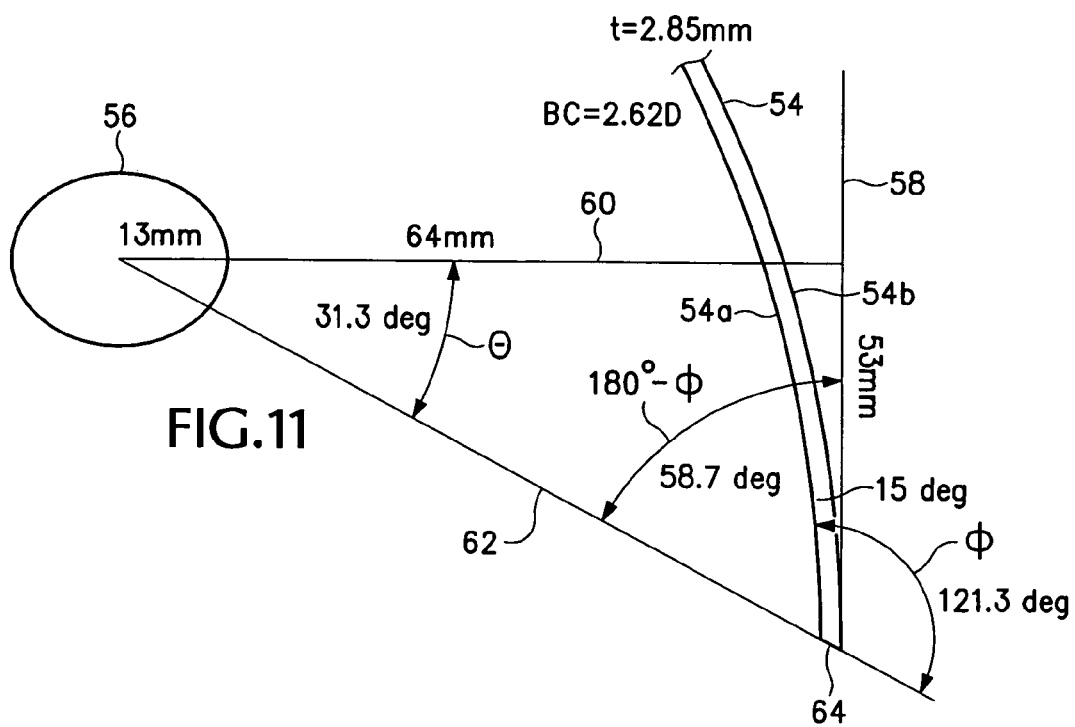
FIG. 11 is a schematic diagram illustrating angles and distances as a typical example of fitting a face shield lens having curvature in horizontal and vertical planes to a wearer.

FIGS. 10 and 11 illustrate typical examples of the geometry encountered when a lens is used as a face shield or visor on a football helmet worn in a normal manner. An example of a single-curvature (cylindrical) lens is shown in FIG. 10. A wearer's eye 40 has a horizontal line of sight 42 through the lens 44, which intersects with an imaginary vertical line 46 at a right angle. Typically, the horizontal distance from the front 40a of the eye 40 to the lens 44 along the line 42 is on the order of fifty-eight millimeters (58 mm). When the eye 40 is directed toward the exposed bottom edge of the lens 44, the line of sight 48 is inclined at an angle $\Theta$ of about 31°. An edge surface 50 is cut on the bottom of the lens 44 so that it makes an obtuse angle $\Phi$ of about 136° with the inner surface 44a of the lens 44. This also means that an acute angle $180°-\Phi$ of about forty-four degrees (44°) is formed by the edge surface 50 with respect to the outer surface 44b of the lens 44. The lens 44 is preferably set at an angle with respect to the vertical plane 46 of approximately fifteen degrees (15°) by the helmet when worn in a normal manner.

Another example is illustrated in FIG. 11. In this example, the lens 54 is a double-curvature lens, i.e., curved in both horizontal and vertical planes, and is affixed to a similar football helmet (not shown). In this case, the horizontal distance between the front of the eye 56 and the lens 54 is approximately sixty-four millimeters (64 mm). The lens 54 has a vertical base curve in diopters of 2.62. The base curve is an industry measurement representing the amount of curvature of the outer surface 54b of the lens and is equal to a numerical constant 530 divided by the radius of curvature in millimeters. Angle $\Theta$, between the horizontal line of sight (indicated by line 60) and a line of sight 62 directed toward the bottom edge surface 64 of the lens, is approximately thirty-one degrees (31°). Because of the difference in geometry occasioned by the use of the double-curved lens 54, the exposed edge surface 64 of the lens 54 has an obtuse angle $\Phi$ of approximately one hundred twenty-one degrees (121°). This angle extends between the line of sight 62 and an imaginary line tangent to the inner surface 54a of the lens 54 at a location adjacent to the edge surface 64. The acute angle $180°-\Phi$ made between another line 58, tangent to the outer lens surface 54b at a location adjacent to the edge surface 64, and the line of sight 62 is approximately fifty-nine degrees (59°).

The examples of FIGS. 10 and 11 illustrate that the desired angle of the edge surface is highly dependent on the geometry of the lens and its mounting structure relative to the wearer. Factors affecting the desired angle include the shape of the lens (that is, whether the lens is a cylindrical lens as in FIGS. 6-9, or a double-curvature lens such as those shown in FIGS. 11 and 3), the base curve of the lens, the size of the lens (contrast FIG. 4 with FIG. 2), and the expected amount of peripheral viewing angle. Generally, however, obtuse angles $\Phi$ within a range of one hundred ten degrees to one hundred sixty degrees (110°-160°), and/or corresponding acute angles $180°-\Phi$ within a range of twenty degrees to seventy degrees (20°-70°), will normally provide an edge surface that alleviates many of the problems encountered with traditional exposed, unrimmed edges.

Providing an obtuse angle Φ in at least a lower, exposed, unrimmed edge of the lens provides several important advantages. Images near the edge are not optically distorted and visual field loss is decreased. This is especially true if the edge surface is cut, rather than molded to shape. Moreover, with the edge surface substantially parallel to the line of sight when the wearer is looking toward the edge, internal reflections of light at the boundary between the edge surface and air will not be directed into the eye. Therefore, visual field loss, disability glare, and annoyance reflections caused by traditional edge surfaces are eliminated.

Additionally because the edge surface angle is obtuse, the lens itself is safer. The obtuse angle tends to prevent the edge from cutting into the wearer's skin if, through impact, the edge contacts the wearer's skin.

Figure 12:
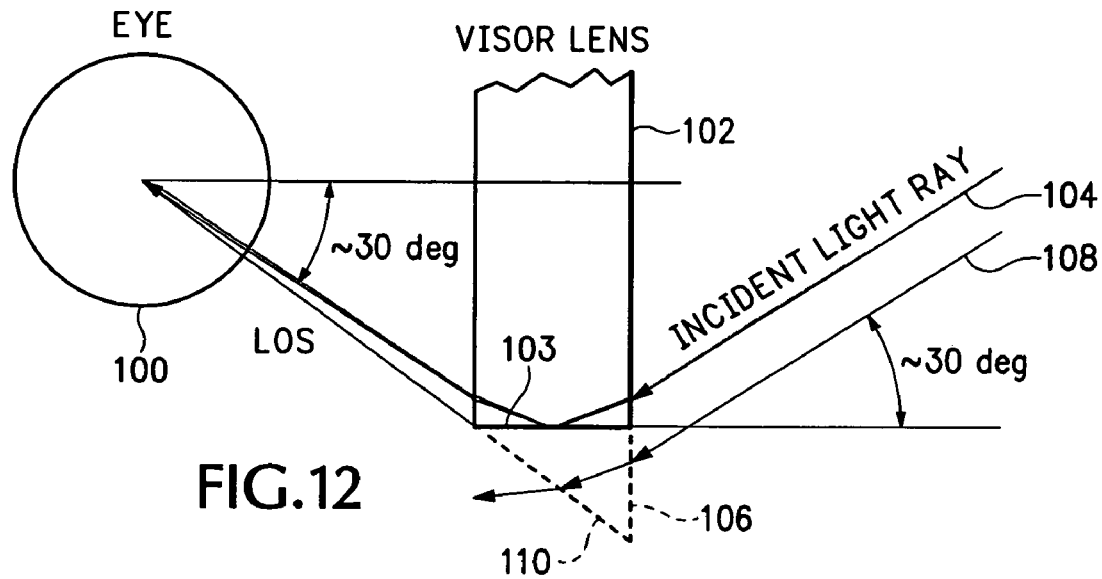
FIG. 12 is a schematic diagram comparing an inclined edge surface to a conventional edge surface with respect to internal reflection.
Figure 13:
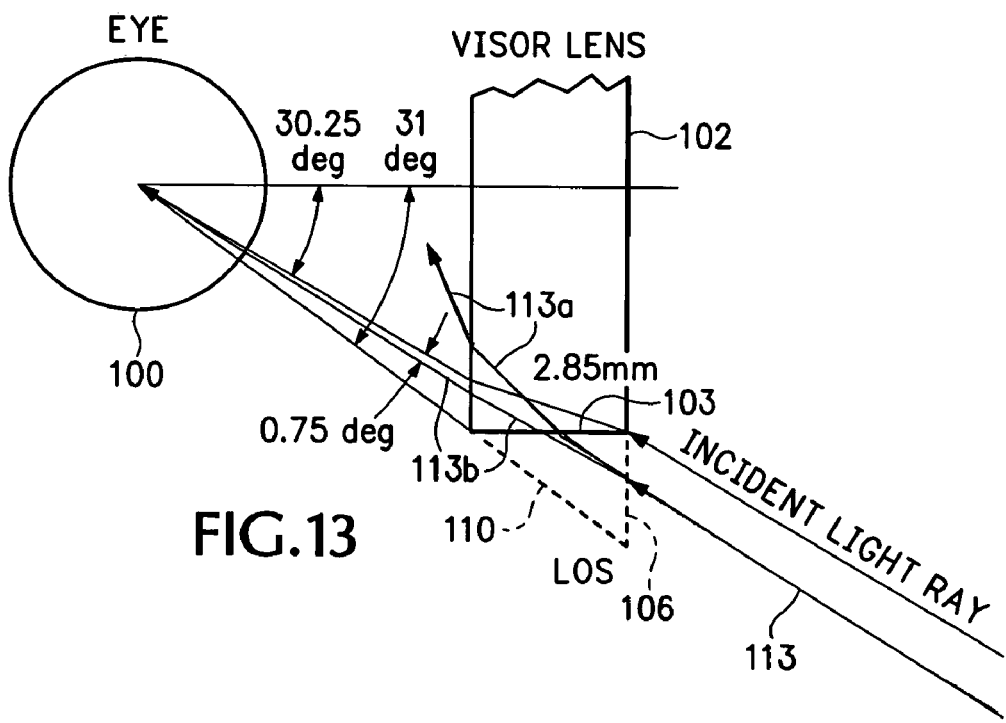
FIG. 13 is a schematic diagram comparing an inclined edge surface to a conventional edge surface with respect to visual field loss.

FIGS. 12 and 13 exemplify the differences in performance between a visor lens of a traditional type having a flat lower edge, and a lens having an inclined edge surface aligned substantially parallel with a user's line of sight directed at the edge surface. Referring to FIG. 12, a user's eye 100 is directed along a line of sight (LOS) toward the flat edge 103 of a traditional visor lens 102. An incident light ray 104 striking the lens 102 refracts slightly, but because of its angle of incidence with the lower edge of the lens, there is total internal reflection that directs the light toward the user's eye. The same lens altered to employ an obtusely-angled edge surface 110 is shown in dashed outline. In this case, an incident light ray 108 strikes the lower portion 106 of the visor lens 102 and refracts to bend slightly toward the horizontal plane. At the edge surface 110, however, the light ray 108 does not internally reflect because its angle of incidence is less than the critical angle for internal reflection of the inclined edge surface 110. Therefore, the ray 108 is transmitted through the lens but away from the viewer's eye 100. In practical terms, the unwanted internal reflection of light such as that produced by incident light ray 104 amounts to glare produced by overhead lights or the sun, based on the relative positions of the head and the lights or the sun. This glare is substantially alleviated by providing the obtusely-angled edge surface 110. Incident rays (not shown) that could reflect internally from surface 110 will not enter the eye.

FIG. 13 exemplifies a loss of visual field caused by the inability of light rays to pass substantially unreflected through the traditional flat lens edge 103, and shows how this condition is alleviated by the use of the obtusely-angled edge surface 110. An incident light ray 113, which strikes the traditional flat edge surface 103, is refracted as 113a away from the viewer's eye 100. In practical terms, this amounts to visual blocking, or at least dimming, of an object in the field of view of the eye and, by itself, amounts to a three-fourths of one degree (0.75°) loss of visual field. In contrast, if the lens is provided with an obtusely-angled edge, such as edge 110, an incident light ray 113 is refracted as 113b normally through the lens to the eye 100 so that no such visual field loss occurs. Moreover, if the traditional flat edge surface 103 is shaped by molding rather than by cutting, the visual field loss is substantially increased due to added distortion. The relative necessity for avoiding such distortion would depend on the usage of the lens.

It will be appreciated that in forming the inclined edge surface of the lens as described above, the angle is chosen so that the edge surface is substantially parallel to the line of sight of a nominal user when the line of sight is directed toward the edge surface. In actual practice, wearers differ physiologically, even when wearing the same-sized headgear or spectacles frames. Differences in the distance between the wearer's eye and the lens will lead to the result that, for some wearers, the line of sight, when directed toward the edge surface of the lens, will not be exactly parallel to the edge surface. However, the line of sight will be substantially parallel because the angular discrepancies between the edge surface and the wearer's line of sight will be minimal. This is because wearers will fall into specific size categories and, although the edge surface angle will be selected for a nominal wearer, other wearers will have nearly the same physiology. Thus, in each such size category, this angular discrepancy will be very small and, for all practical purposes, the wearer's line of sight will be substantially parallel to the edge surface.

While the angle of the edge surface optimally is an angle that provides an edge surface substantially parallel to the wearer's line of sight when directed toward the edge surface, benefits to the wearer will accrue if the angle Φ is merely obtuse. Alternatively, benefits to the wearer will accrue if the angle 180°-Φ is merely acute.

As the wearer's eyes rotate toward certain edge portions of the lens, the angle between the line of sight and the exposed edge of the lens may change. If the edge portions are outside the usable field of view, it is probably not necessary to provide an edge surface having an optimum angle at such edge portions.

Also, the angle chosen for the edge surface of the lens may change over the periphery of the exposed edge to optimize its effectiveness. Depending upon how the lens is cut, the angle between the line of sight and the periphery of the lens may be different as the eye rotates. Thus, if it is desired to provide an edge surface that is parallel to the line of sight at all points along the periphery within the usable field of view, the angle of the edge surface may change from the lower edge of the lens to the extreme lateral edge to the superior edge. However, for ease of manufacturing, an angle may be chosen which provides best results in the most usable portion of the wearer's field of view and is retained over other edge portions of the lens. If more performance is required, however, the angle may change as described above.

It should also be understood that there should preferably be a slight chamfer or smoothing at the edge portions along both the inner and outer surfaces of the lens so that injury does not occur in the event that the lens is pushed into the wearer's face through physical contact or the like, or during normal handling of the lens. These chamfers, or a slight rounding of the angles, do not affect the edge surface angle itself, and it is understood that the angled edge surface needs to extend between the inner and outer lens surfaces coextensively only with most of the thickness of the lens adjacent to the edge surface, rather than coextensively with all of the lens thickness at such location.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

What is claimed is:

1. An optical lens mountable on a support to be worn by a user and having a width so as to be interposed into said user's field of view, the lens having an inner surface and an outer surface and having a lower exposed edge, the lower exposed edge having an edge surface that extends between said inner surface and said outer surface over at least a portion of the width of said lens and forms an acute angle with respect to said outer lens surface, said acute angle lying within a range of between twenty degrees (20°) and seventy degrees (70°).

2. The optical lens of claim 1 wherein said lower edge surface is substantially planar.

3. The optical lens of claim 2 wherein the support is a sports helmet.

4. The optical lens of claim 1 wherein said lens is a unitary lens matingly mountable to an eyeglass frame.

5. The optical lens of claim 1 wherein said lens is one of a pair of dual lenses matingly mountable to a dual lens eyeglass frame.

6. The optical lens of claim 1 wherein said lens is convexly curved in at least a horizontal plane.

7. The optical lens of claim 5 wherein said lens is also convexly curved in a vertical plane.

8. The optical lens of claim 1 wherein said lens is a flat pane lens.

9. The optical lens of claim 1 wherein said edge surface is a cut surface.

10. The optical lens of claim 3 wherein said angle varies in magnitude along said edge surface.

11. An optical lens mountable on a support and having a width so as to be interposed in a user's field of view, the lens having an inner surface and an outer surface and further having a lower edge surface extending between said inner and outer surfaces over at least a portion of said width at an upwardly inclined angle such that said lower edge surface defines a plane that is substantially parallel to said user's line of sight when said line of sight is directed toward said lower edge surface, wherein said plane forms an acute angle at an intersection with said outer surface and forms an obtuse angle at an intersection with said inner surface.

12. The optical lens of claim 11 wherein said lower edge surface intersects with said outer edge surface over at least a major portion of the width of said lens at an acute angle that lies in a range of between twenty degrees (20°) and seventy degrees (70°).

13. The optical lens of claim 12 wherein said support is a sports helmet.

14. The optical lens of claim 11 wherein said lens is a unitary lens matingly mountable to a sports helmet so as to be interposed into a wearer's field of view.

15. The optical lens of claim 11 wherein said lens is a unitary lens matingly mountable to an eyeglass frame.

16. The optical lens of claim 11 wherein said lens is one of a pair of dual lenses matingly mountable to a dual lens eyeglass frame.

17. The optical lens of claim 11 wherein said lens is convexly curved in at least a horizontal plane.

18. The optical lens of claim 15 wherein said lens is also convexly curved in a vertical plane.

19. The optical lens of claim 11 wherein said lens is a flat pane lens over at least a portion of said width.

20. In combination, an optical lens and a sports helmet, the lens having a width and mounted on the sports helmet so as to be interposed in a wearer's field of view, the lens having an inner surface and an outer surface and further including a lower exposed edge surface extending between the inner and outer surfaces at an angle to thereby define a plane substantially parallel to said wearer's line of sight when said line of sight is directed toward said lower edge surface and when said sports helmet is worn in a normal manner, said lower edge surface intersecting said outer surface at an acute angle over at least a portion of said width.

21. The combination of claim 20 wherein said acute angle is in a range of between twenty degrees (20°) and seventy degrees (70°).

22. The combination of claim 21 wherein said lens is convexly curved in at least a horizontal plane.

23. The combination of claim 21 wherein said lens is convexly curved in at least a vertical plane.

24. The combination of claim 21 wherein said lens is a flat pane lens over at least a portion of said width.

25. The combination of claim 21 wherein said lower edge surface is a cut surface.

26. The combination of claim 21 wherein said angle varies in magnitude over at least a portion of said width.

\* \* \* \* \*